United States Patent Office 2,977,337
Patented Mar. 28, 1961

2,977,337

CYANOETHYLATED POLYACRYLONITRILE COMPOSITIONS

Walter H. Schuller, Stamford, Conn., assignor to American Cyanamid Company, New York, N.Y., a corporation of Maine No Drawing. Filed Mar. 21, 1956, Ser. No. 572,832

11 Claims. (Cl. 260—45.5)

This invention relates broadly to cyanoethylated polyacrylonitrile compositions. More particularly, it is concerned with a method of preparing such compositions and with the product thereof.

It was known prior to our invention that acrylonitrile could be added, with the aid of alkaline catalysts, to compounds containing one or more atoms of active hydrogen thereby to form cyanoethylated products (see, for example, Compt. rend., 27th Cong. intern. chim. ed. Brussels (1954), III, 363–6, and the bibliography therein; also U.S. Patents 2,608,554–5 to Bullitt, Jr., each dated August 26, 1952). However, to the best of our knowledge and belief it was not known prior to our invention that the backbone of an acrylonitrile polymer could be cyanoethylated at the alpha-carbon atom, thereby providing polymeric compositions having properties which are different in kind from those of the starting polyacrylonitrile, e.g., a "free radical"-initiated polymer of acrylonitrile.

It is a primary object of the present invention to provide a new class of polymeric compositions, more particularly, modified polyacrylonitriles, for use in industry.

It is a further object of the invention to increase the field of utility of polymers of acrylonitrile by a treatment which alters their properties, e.g., lowers their melting point and improves their solubility characteristics; and, also, to increase the field of utility of monomeric acrylonitrile.

Another object of the invention is to provide a method of preparing the cyanoethylated polyacrylonitriles of this invention.

Still other objects of the invention will be apparent to those skilled in the art from the following more detailed description and the illustrative examples.

The foregoing objects are accomplished by reacting acrylonitrile and a polymer of acrylonitrile, while admixed with a strong base (e.g., an alkali-metal methoxide, ethoxide or tert.-butoxide) as a catalyst for the reaction and at a temperature of from about $-75°$ C. to about $+75°$ C., more particularly at from $+10°$ C. to $+50°$ C. The reaction is effected in a mutual solvent for the monomeric and polymeric acrylonitrile reactants which is inert during the reaction, e.g., dimethylformamide. The polyacrylonitrile reactant is one containing an average of at least 50% by weight of acrylonitrile combined in the polymer molecule; it contains in its molecular structure a multiplicity of units represented by the formula

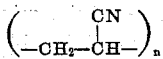

where $n$ represents a number having an average value ranging between 8 and 60,000. At the end of the reaction period the cyanoethylated polyacrylonitrile is isolated from the reaction mass. Both acetone-soluble and acetone-insoluble cyanoethylated polyacrylonitrile can be recovered.

Suitable catalysts (that is, strong bases) for use in carrying out the reaction are given in, for instance, the aforementioned Bullitt, Jr., patents and include alkali-metal alkoxides, aryls and amides, e.g., sodium and potassium methoxides, ethoxides and tert.-butoxides, sodium and potassium amides, phenyllithium, indenyllithium, lithium ethylphenylamide, lithium diphenylamide; and the salts, with alkali-forming metals (group IA and IIA metals), of alkanes, aralkanes, nitriles, amines, etc., e.g., dianiline calcium, ethylsodium, etc. Such catalysts have been described as being salts, with an alkali-forming metal, of an acid having a $pK_a$ of from 15 to 75. Other suitable catalysts include the strongly basic quaternary ammonium hydroxides, e.g., tetramethyl ammonium hydroxide, tetraethanol ammonium hydroxide, benzyl trimethyl ammonium hydroxide, benzyl triethyl ammonium hydroxide, and others.

The base is employed only in catalytic amounts; that is to say, in amounts within the range of from about 0.01% to 5%, and preferably from 0.1% to 2%, by weight of the total weight of acrylonitrile and acrylonitrile polymer.

The polymeric acrylonitrile reactant can be either a homopolymer of acrylonitrile or a copolymer (including random, graft and block copolymers) of acrylonitrile containing an average of at least 50%, e.g., from 55 to 99%, by weight of acrylonitrile combined in the polymer molecule. Such polymers are prepared, for example, by "free radical" initiation of polymerization of the monomer or mixture of monomers with peroxide catalysts, "redox" catalyst systems, etc. Reference is made to our copending application Serial No. 572,830, filed concurrently herewith, now abandoned for further details and information on polymerization conditions. Still further information on technique that can be used in preparing the acrylonitrile polymer reactant will be found in Fikentscher et al. U.S. Patent No. 2,140,048 dated December 13, 1938, Bauer et al. U.S. Patent No. 2,160,054 dated May 30, 1939, Crawford et al. U.S. Patent No. 2,194,354 dated March 19, 1940, Britton et al. U.S. Patent No. 2,333,635 dated November 9, 1943, Jacobson U.S. Patent No. 2,436,926 dated March 2, 1948 and British Patent 586,881 with reference to the production of other polymerization products.

Illustrative examples of substances that can be copolymerized with acronitrile to form a copolymeric reactant that is cyanoethylated are vinyl compounds which are different from acrylonitrile, including the vinyl aromatic compounds, more particularly the vinyl aromatic hydrocarbons (e.g., styrene, the methyl and other alkyl styrenes, the various dialkyl styrenes, etc.), other aliphatic compounds containing a $CH_2=C<$ grouping, e.g., the various substituted acrylonitriles (e.g., methacrylonitrile, the molecular weight of which is 67, ethacrylonitrile, phenylacrylonitrile, etc.), the various acrylamides (e.g., acrylamide itself, the molecular weight of which is 71, methacrylamide, ethacrylamide, the N-monoalkyl and -dialkyl acrylamides and methacrylamides, e.g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e.g., N-monophenyl and -diphenyl acrylamides and methacrylamides, etc.), vinyl esters, e.g., vinyl acetate, vinyl propionate, vinyl butyrate, vinyl isobutyrate, vinyl valerate, vinyl acrylate, vinyl methacrylate, etc., esters of an acrylic acid (including acrylic acid itself, the molecular weight of which is 72, and the various alpha-substituted acrylic acids, e.g., methacrylic acid, ethacrylic acid, phenylacrylic acid, etc.), more particularly the alkyl esters of an acrylic acid, e.g., the ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=C<$ grouping, more particularly a single $CH_2=C<$ grouping.

Still other examples of unsaturated materials that can be copolymerized with acrylonitrile in forming the polymeric reactant are those which are generically and specifically set forth in, for instance, column 3, lines 5-47, of Price et al. U.S. Patent No. 2,722,525 dated November 1, 1955.

In making the acrylonitrile copolymeric reactant (more particularly thermoplastic acrylonitrile copolymeric reactant), the acrylonitrile is employed in the mixture of comonomers in an amount such that at least 50% by weight of combined acrylonitrile is present in the copolymer. When the polymerization rates of the acrylonitrile and additional monomer or monomers are different from each other, then it may be necessary to start with an amount of acrylonitrile either more or less than 50% by weight of the total mixture of monomers in order that the final copolymer will contain at least 50% by weight of combined acrylonitrile in the copolymer molecule.

The average molecular weight of the polymeric acrylonitrile reactant used in practicing the present invention can be varied widely, as desired or as conditions may require, but ordinarily is within the range of from about 400 to about 3,000,000 or more as calculated from viscosity measurements using the Staudinger equation (reference: Houtz U.S. Patent No. 2,404,713 dated July 23, 1946); or by determining the average molecular weight by other known methods and converting the value thereby obtained to a "Staudinger" average molecular weight (method described briefly above and more fully in the aforementioned patent).

The proportions of monomeric acrylonitrile to polymeric acrylonitrile likewise can be widely varied depending, for example, upon the time and temperature of reaction, the kind and amount of strong base used as a catalyst for the reaction, the degree of cyanoethylation desired, and other influencing factors. In general, however, the monomeric acrylonitrile is employed in a ratio of at least 1 mole thereof for each 100 alpha-carbon atoms in the backbone of the polyacrylonitrile. One can also use a ratio of 100 moles of monomeric acrylonitrile for each 100 alpha-carbon atoms in the polyacrylonitrile backbone when a higher degree of cyanoethylation is desired. Ordinarily, the monomeric acrylonitrile is employed in excess (e.g., from 50% to 1500% or more in excess) of that theoretically required to effect the desired degree of cyanoethylation under the particular reaction conditions.

In practicing the present invention the reaction between the monomeric acrylonitrile and polymeric acrylonitrile is effected in an inert, mutual solvent for said reactants; that is, a mutual solvent which is inert during the course of the reaction. Illustrative examples of such solvents are Dimethylformamide
N,N-dimethylcyanoacetamide
Dimethyl sulfoxide
Dimethyl sulfone
Ethylene thiocyanate
Trimethylene thiocyanate
Ethylene carbonate
Propylene carbonate The time of the reaction varies widely, depending upon the particular reaction conditions, and may range, for example, from a few minutes to two weeks or more.

If desired, the reaction mass can be neutralized at the end of the reaction period, e.g., by the addition of an acidic substance such as ammonium chloride, acetic acid or the like. After removing unreacted acrylonitrile, if present, the cyanoethylated polyacrylonitrile is then isolated either as a single product or in fractions having different physical characteristics, e.g., different softening points and solubilities.

In order that those skilled in the art may better understand how the present invention can be carried into effect, the following examples are given by way of illustration and not by way of limitation. All parts and percentages are by weight.

*Example 1*

To 110 ml. of dimethylformamide is added 15 ml. of freeze-dried acrylonitrile monomer. The resulting solution is chilled in an ice bath, and 5 g. of pulverized homopolymeric acrylonitrile, having an average molecular weight of about 78,500 (Staudinger method), is added slowly thereto with vigorous stirring. After warming on a steam bath, a small quantity of insoluble material is filtered off through cheese cloth. To the clear filtrate is added 5 ml. of a 5% solution of potassium tert.-butoxide in tert.-butanol. An exotherm to 33° C. is observed and the mixture is immediately cooled to 20° C. in an ice bath. After standing at room temperature (20°-30° C.) for ten days, the fluid, reddish-black solution is poured, with stirring, into a large excess of ethanol. The yellow precipitate (cyanoethylated polyacrylonitrile) that forms is collected by centrifuging, washed with ethanol and air-dried. The yield of dried product is 5.9 g.

The dried, cyanoethylated product is pulverized in a mortar and extracted with acetone in a Soxhlet extractor for 16 hours, air-dried, re-ground to a fine powder in a mortar, and then extracted with acetone for another 8 hours. The yellow-orange solid remaining in the Soxhlet thimble weighs 2.7 g. Examination of the infrared curve obtained upon examining this material indicates that there is one cyanoethyl group on every third or fourth mer. The Staudinger molecular weight of this fraction is approximately 39,000. It is insoluble in acetone and acrylonitrile monomer, but about 80% of it dissolves in acetonitrile.

The combined acetone extracts are evaporated to dryness and dried in vacuo. The residue is a yellow solid weighing 1.75 g. The Staudinger molecular weight of this fraction is about 26,000. Infrared examination indicates that there is one cyanoethyl group present for every three or four methylene groups (that is, one cyanoethyl group on every second or third mer or base unit). This fraction of cyanoethylated polyacrylonitrile is completely soluble in acetonitrile, acetone, and in acrylonitrile monomer.

The products of this example can be used as modifiers, specifically as plasticizers, of other synthetic resins and polymers in making molding compositions (especially when a cross-linking agent is incorporated therein), as a component of coating compositions, and for numerous other purposes.

*Example 2*

To a solution of 50 g. of homopolymeric acrylonitrile of molecular weight 1250 (microisopiestic molecular weight), prepared by the polymerization of acrylonitrile in dimethylformamide using alpha,alpha'-azodiisobutyronitrile as a polymerization catalyst, in 1100 ml. of dimethylformamide, is added 200 ml. of acrylonitrile (dried over anhydrous calcium sulfate and redistilled). This solution is cooled in an ice bath to 10° C. and 25 ml. of a 1.03 N solution of potassium tert.-butoxide in tert.-butanol is slowly added with vigorous shaking and cooling. The temperature of the mixture rises to 20° C., whereupon it is promptly cooled to 10° C. and then allowed to warm to room temperature (20°-30° C.). Three days later the reddish-black solution is poured into a large excess of ethanol, the polymer is filtered off, washed with ethanol followed by diethyl ether, and then dried. The yield of dried cyanoethylated polyacrylonitrile amounts to 70 g. It is completely soluble in acetonitrile, moderately soluble in acetone and slightly soluble in acrylonitrile monomer. An infrared curve on the mixture indicates that about every third or fourth mer or base unit in the backbone chain of the polyacrylonitrile is cyanoethylated on the alpha-carbon atom. This estimate is based upon the presence of a strong band at 1420 cm.$^{-1}$ in the cyanoethylated polymer associated with the presence of a —CH$_2$CN grouping.

Example 3

To 10 g. of homopolymeric acrylonitrile (Staudinger molecular weight of about 78,000), dissolved in 90 g. of dimethylformamide, are slowly added 10 g. of freeze-dried monomeric acrylonitrile and 0.5 ml. of a 1.7 N sodium methoxide solution in methanol, at room temperature, over a period of 10 minutes. After 2½ hours at room temperature, the mixture is poured into an excess of ethanol, and the yellow solid (cyanoethylated polyacrylonitrile) that precipitates, is filtered off, rinsed with ethanol and dried. A portion of this dried, cyanoethylated polyacrylonitrile is extracted with acetone in a Soxhlet extractor for 8 hours. The reddish-orange acetone solution, upon evaporation to dryness, yields only a trace of a dark syrup. The extracted cyanoethylated polymer, now tan in color, is found to be insoluble in acetonitrile and in acrylonitrile monomer. An infrared curve on this product, however, indicates that the polyacrylonitrile has been cyanoethylated to the extent of one cyanoethyl group on about every six or eight mers or units in the backbone chain.

Example 4

To 100 g. of dimethylformamide are added 5 g. of a copolymer of about 96% acrylonitrile and about 4% acrylic acid, and 20 ml. of dry acrylonitrile monomer. The Staudinger molecular weight of the copolymer is about 60,000. To the resulting solution at 20° C. is added 8.0 ml. of a 1.03 N solution of potassium tert.-butoxide in tert.-butanol, slowly and with cooling and stirring. After standing at room temperature for about 16 hours, the solution is poured into an excess of ethanol and the yellow precipitate (cyanoethylated copolymer of acrylonitrile and acrylic acid) is filtered off, washed with ethanol and dried. An infrared curve indicates the copolymer to be cyanoethylated on about every fourth or fifth monomer unit on the backbone chain.

Example 5

To 120 g. of dry dimethylformamide are added 5 g. of a copolymer of about 85% acrylonitrile and about 15% butyl acrylate (Staudinger molecular weight about 52,000) and 20 ml. of dry, redistilled acrylonitrile. To this solution is added dropwise 1.5 ml. of 1.03 N potassium tert.-butoxide in tert.-butanol, with stirring and cooling, maintaining the temperature at 10° C. The temperature is then allowed to rise to 20° C. and held there for 5 hours, whereupon the cyanoethylated copolymer is precipitated with ethanol, collected by filtration and dried. Infrared analysis indicates about every seventh to ninth monomer unit in the backbone chain is cyanoethylated on the alpha-carbon atom.

Example 6

Essentially the same procedure is followed as described under Example 5 with the exception that, instead of the copolymer of that example, there is used a copolymer of about 80% acrylonitrile and 20% methyl acrylate (Staudinger molecular weight about 66,000). Infrared analysis indicates that the isolated cyanoethylated copolymer is cyanoethylated on the alpha-carbon atom of about every ninth or tenth unit in the backbone chain.

Example 7

To 125 g. of dry dimethylformamide are added 5 g. of a copolymer of about 50% each of acrylonitrile and acrylamide (Staudinger molecular weight of about 90,000) and 20 g. of dry acrylonitrile. To the resulting solution is added 2.0 ml. of a 1 N solution of potassium tert.-butoxide in tert.-butanol, slowly, and at 15° C. After 5 hours at 20° C., with stirring, the cyanoethylated copolymer is isolated by precipitation in a large excess of ethanol, washed with ethanol and dried. The dried product is useful as a plasticizer for other polymers and resins.

Example 8

To 100 ml. of a 1:1 mixture, by volume, of dry benzene and dimethylformamide are added 20 ml. of redistilled acrylonitrile (dried over anhydrous calcium sulfate) and 5 g. of a copolymer of about equal parts by weight of styrene and acrylonitrile. The average molecular weight (Staudinger method) of the copolymer is about 50,000. To the clear solution is slowly added, over a 20-minute period, 3.0 ml. of 1.0 N potassium tert.-butoxide in tert.-butanol. An exotherm of 1° C. is observed. Seven (7) hours later about half of the reaction mass is poured off, centrifuged free of a small amount of gelatinous material, and the supernatant is poured into a large excess of ethanol. The yellow precipitate of cyanoethylated polyacrylonitrile is filtered off, washed with ethanol and dried. It weighs 1.2 g. Based upon an analysis of the infrared curve of this product, it is apparently a styrene-acrylonitrile copolymer which has been cyanoethylated on almost none of the alpha-carbon atoms to which a phenyl group is attached, but has been cyanoethylated on almost all of the alpha-carbons of the backbone chain to which a nitrile group is attached, e.g.:

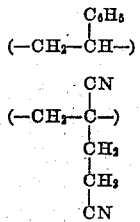

where these two units are randomly arranged in the backbone chain. Substantiating evidence is found in the fact that under similar conditions, polystyrene is not cyanoethylated to any significant extent.

The product of this example can be used in the production of molding compositions and molded articles.

Example 9

A well-molded article having good strength and other good physical properties is produced by molding finely-divided, cyanoethylated homopolymeric acrylonitrile for 10 minutes in a compression mold at 310° F. under a pressure of about 1500 pounds per square inch to yield bars ¼″ x ½″ x 5″. The cyanoethylated polyacrylonitrile is one produced by cyanoethylation of homopolymeric acrylonitrile, having an isopiestic molecular weight of about 1250, in a manner similar to that described under Example 2, so that about every second or third mer in the backbone chain of the polyacrylonitrile is cyanoethylated.

It is to be understood that our invention is not limited to the specific ingredients named in the above illustrative examples nor to the particular proportions and methods named therein. Thus, instead of dimethylformamide as the inert, mutual solvent in which the reaction is effected, we can use any other mutual solvent for the acrylonitrile monomer and the polymeric acrylonitrile that is inert during the reaction, numerous examples of which have been given hereinbefore. Or, we may use mixtures of different, inert, mutual solvents in any proportions, such as mixtures of those specifically named; or mixtures with diluents which alone are non-mutual solvents for either or both of the reactants but conjointly with a mutual solvent are capable of dissolving the reactants. Variations in catalyst and amount thereof, in proportions of acrylonitrile and polyacrylonitrile, in time, temperature and other conditions of reaction, etc., also can obviously be made, as has been indicated in the portion of this specification prior to the examples.

Other uses of the cyanoethylated polyacrylonitriles of this invention, in addition to the specific use illustrated by Example 9, include their use in blends with polyacrylonitriles (both homopolymers and copolymers) to impart better flow characteristics thereto during molding or otherwise forming shaped articles therefrom; and in plasticizing or otherwise modifying, to improve the useful properties thereof, a wide variety of other addition and condensation polymers, natural resins and gums, etc., including various polyvinyl resins, urea-formaldehyde resins, phenol-formaldehyde resins, melamine-formaldehyde resins, epon resins, alkyd resins, polyester resins, rosin, shellac, and others. A field of particular utility is in the production of molding compositions and molded articles, in conjunction with a cross-linking agent thereby to obtain a thermoset product.

By cyanoethylating the alpha-carbon atom of the backbone chain of an acrylonitrile polymer in accordance with this invention, which to the best of our knowledge and belief was unknown to the art prior to our invention, a new class of modified polyacrylonitriles has been provided, with properties that can be varied merely by varying the degree of cyanoethylation and the composition and molecular weight of the polymeric reactant. In this way products can be readily and economically "tailored" for a specific use. The practical advantages of this will be immediately apparent to those skilled in the art.

I claim:

1. The method of preparing an alpha-carbon cyanoethylated polyacrylonitrile composition which comprises dissolving, in the absence of water, monomeric acrylonitrile and a free-radical initiated linear polymer of acrylonitrile containing, combined in the polymer molecule, from 50% to 100% by weight of acrylonitrile and up to 50% by weight of a compound which is copolymerizable with acrylonitrile and contains a CH$_2$=C< grouping, and said polymer containing in its molecular structure a multiplicity of units represented by the formula

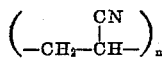

where $n$ represents a number having an average value ranging between 8 and 60,000, in a mutual non-aqueous polar organic solvent for acrylonitrile and said polymer that is inert during the reaction and while the aforesaid reactants are admixed with a strong base as a catalyst for the reaction, said strong base being selected from the class consisting of (a) salts, with an alkali-forming metal, of an acid having a pKa of from 15 to 75, (b) tetramethyl ammonium hydroxide, (c) tetraethanol ammonium hydroxide, (d) benzyl trimethyl ammonium hydroxide, and (e) benzyl triethyl ammonium hydroxide, reacting the monomeric acrylonitrile with the said linear polymer and isolating the resulting cyanoethylated polyacrylonitrile from the reaction mass.

2. A method as in claim 1 wherein the strong base is an alkali-metal tert.-butoxide.

3. A method as in claim 1 wherein the alkali-metal tert.-butoxide is potassium tert.-butoxide.

4. A method as in claim 1 wherein the strong base is an alkali-metal methoxide.

5. A method as in claim 1 wherein the alkali-metal methoxide is sodium methoxide.

6. A method as in claim 1 wherein the mutual solvent is dimethylformamide.

7. A method as in claim 1 wherein the monomeric acrylonitrile is employed in a ratio of at least 1 mole thereof for each 100 alpha-carbon atoms in the backbone of the polymer of acrylonitrile.

8. A method of preparing a polymer of acrylonitrile which is soluble in a solvent selected from the class consisting of acetonitrile, acetone and acrylonitrile which comprises dissolving in the absence of water at room temperature free radical-initiated homoplolymeric acrylonitrile with monomeric acrylonitrile in a mutual non-aqueous polar solvent while admixed with a strong base as a catalyst for the reaction, said strong base being selected from the class consisting of (a) salts, with an alkali-forming metal, of an acid having a pKa of from 15 to 75, (b) tetramethyl ammonium hydroxide, (c) tetraethanol ammonium hydroxide, (d) benzyl trimethyl ammonium hydroxide, and (e) benzyl triethyl ammonium hydroxide, reacting the monomeric acrylonitrile with the said linear polymer, and subsequently extracting the soluble polyacrylonitrile with a solvent selected from said class.

9. A method as in claim 8 wherein the strong base catalyst is an alkali metal tertiary butoxide.

10. A method as in claim 9 wherein the homopolymeric acrylonitrile has an average molecular weight of about 78,500, the alkali metal is potassium and the solvent is dimethyl formamide.

11. A free radical-initiated polymer of acrylonitrile containing cyanoethyl groups attached to at least one fourth of the methylene groups of the backbone of the said polymer; the cyanoethylated structure being represented by the following formula:

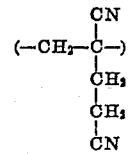

said polymer being prepared by the method set forth in claim 8.

References Cited in the file of this patent

UNITED STATES PATENTS

| | | |
|---|---|---|
| 2,341,553 | Houtz | Feb. 15, 1944 |
| 2,608,554 | Bullitt | Aug. 26, 1952 |
| 2,620,324 | Coover et al. | Dec. 2, 1952 |

FOREIGN PATENTS

| | | |
|---|---|---|
| 499,577 | Canada | Jan. 26, 1954 |